Aug. 30, 1966    F. C. RANKIN    3,268,950
ADJUSTABLE TREAD RUBBER EXTRUDING DIE
Filed Dec. 23, 1964    3 Sheets-Sheet 1

INVENTOR.
FLOYD C. RANKIN
BY
Brown, Critchlow,
Flick & Peckham.
ATTORNEYS.

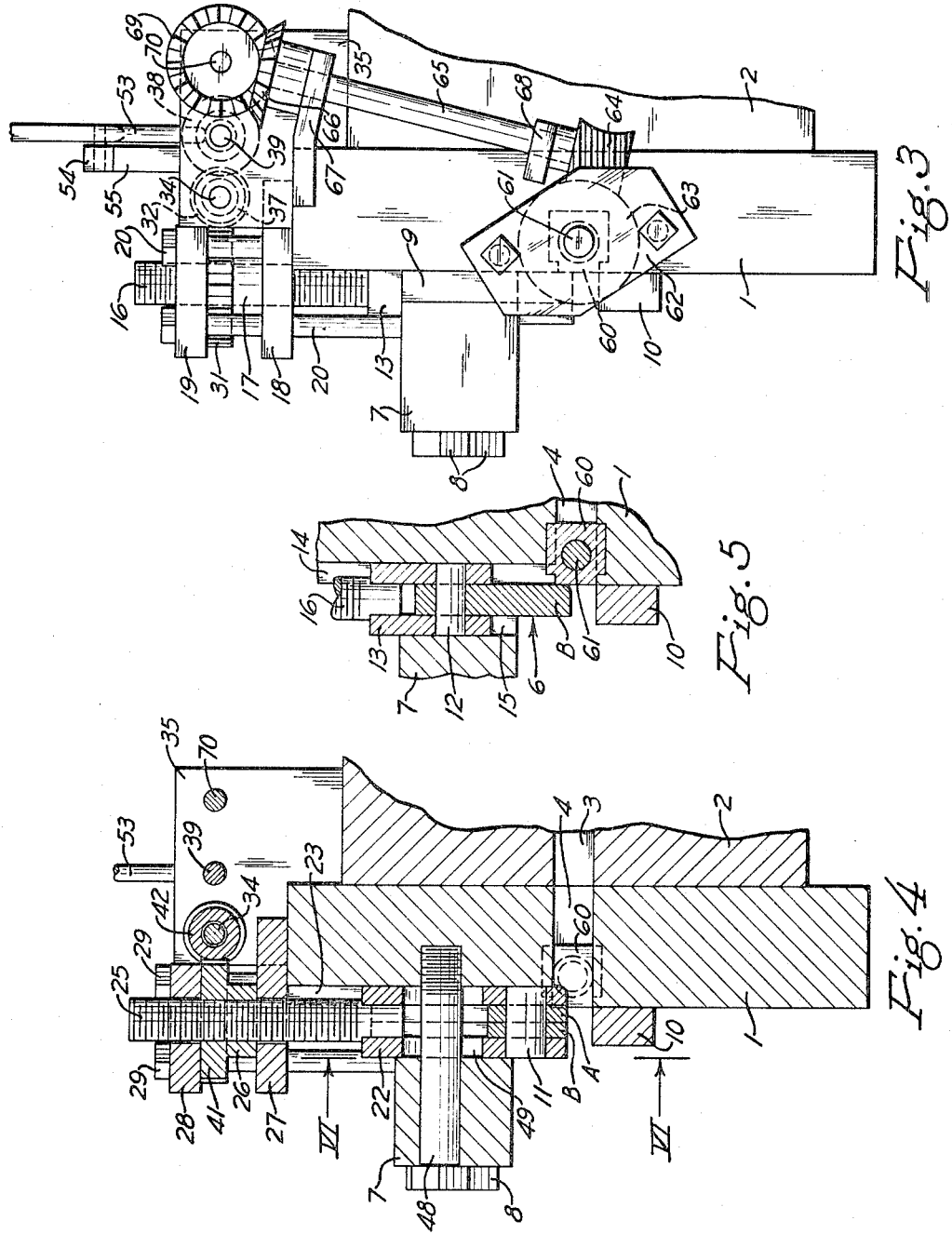

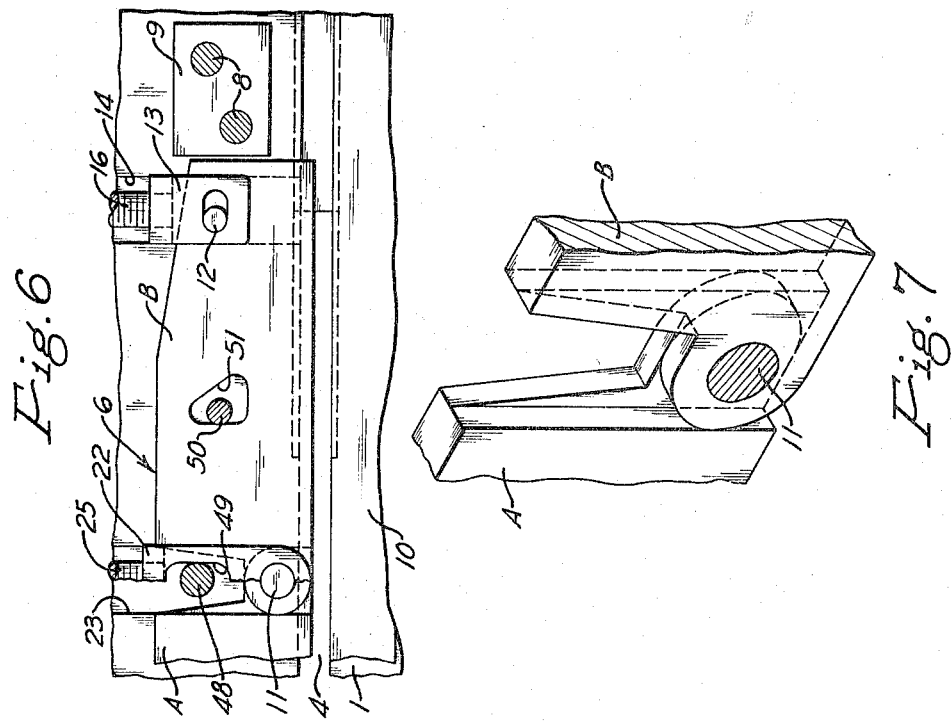
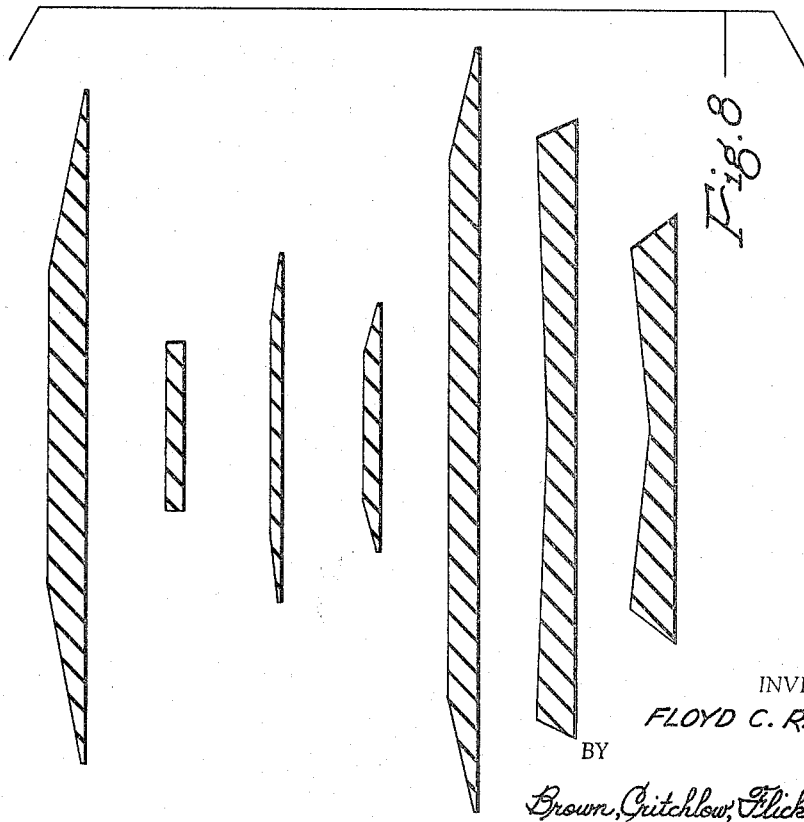

United States Patent Office 3,268,950
Patented August 30, 1966

3,268,950
ADJUSTABLE TREAD RUBBER EXTRUDING DIE
Floyd C. Rankin, Indiana, Pa., assignor to McCreary Tire & Rubber Company, Indiana, Pa., a corporation of Pennsylvania
Filed Dec. 23, 1964, Ser. No. 420,526
5 Claims. (Cl. 18—12)

This invention relates to adjustable dies for extruding strips of tire tread rubber, and more particularly to the manner in which the dies are adjustable.

A tread rubber extruding die that is used in the industry is disclosed in Patent 2,720,679. The rubber being extruded in a strip from that die is sized and shaped by adjustable cutters at its opposite sides and by a row of vertical die blades that are individually adjustable up and down by means of a wrench. The blades control the width of the strip of rubber delivered to the cutters and, with the cutters, also determine the shape of the upper surface of the finished strip. Because there is a large number of vertically adjustable blades, it requires a considerable length of time to readjust them for a strip having a different contour, width and/or thickness. This can become a serious problem especially when the tread manufacturer receives several small orders, each for strips of tread rubber having a different cross section than the other orders, because the expense of adjusting the die for each order adds materially to the cost of the strips.

It is among the objects of this invention to provide an extruding die for strips of tire tread rubber, which is quickly and easily adjustable, which is adjusted by merely operating electric motors, which is simple in construction and operation, and which allows the thickness of tread strip to be changed quickly without changing the contour of its upper surface.

In accordance with this invention a die block is provided with a horizontal extrusion slot through it for passage of the tread rubber being formed into a strip. Mounted above the exit end of the slot is a vertical die plate. Means are provided for adjusting the plate bodily downward across the slot to reduce the height of the slot exit. The die plate is jointed centrally on a horizontal axis, and there are means for adjusting the jointed center of the plate vertically relative to its ends to provide a predetermined shape for the top of the tread strip issuing from the slot. In order to vary the width of the slot exit, a pair of laterally spaced gate members may be disposed in the exit for adjustment toward and away from each other by suitable means, such as screws. Preferably, the plate adjustment and the gate member adjustment are each made by an electric drive.

Figure 1:
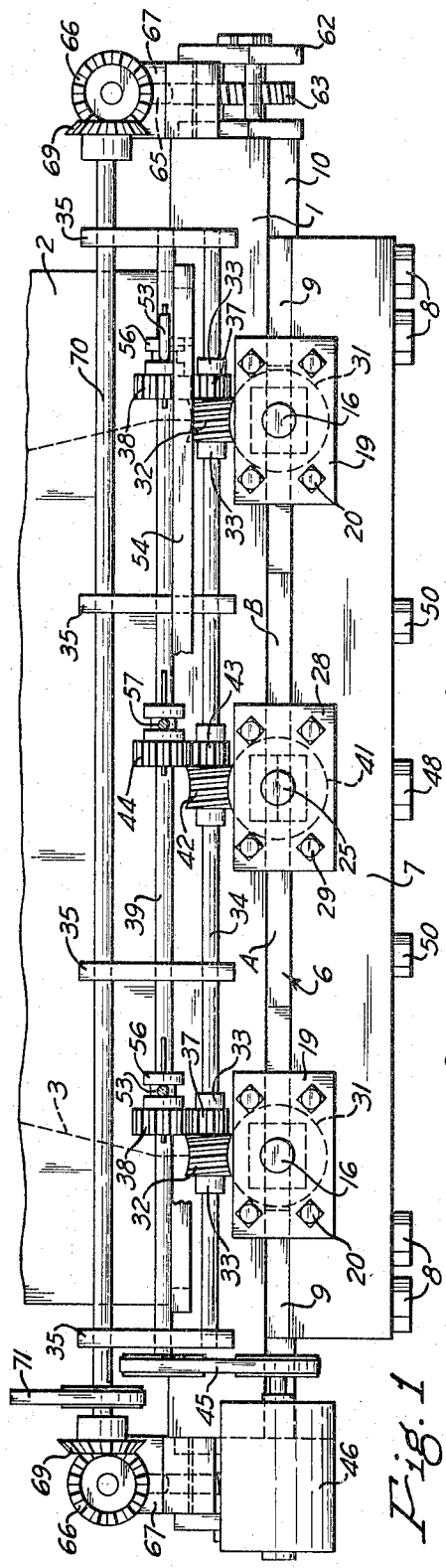
Figure 2:
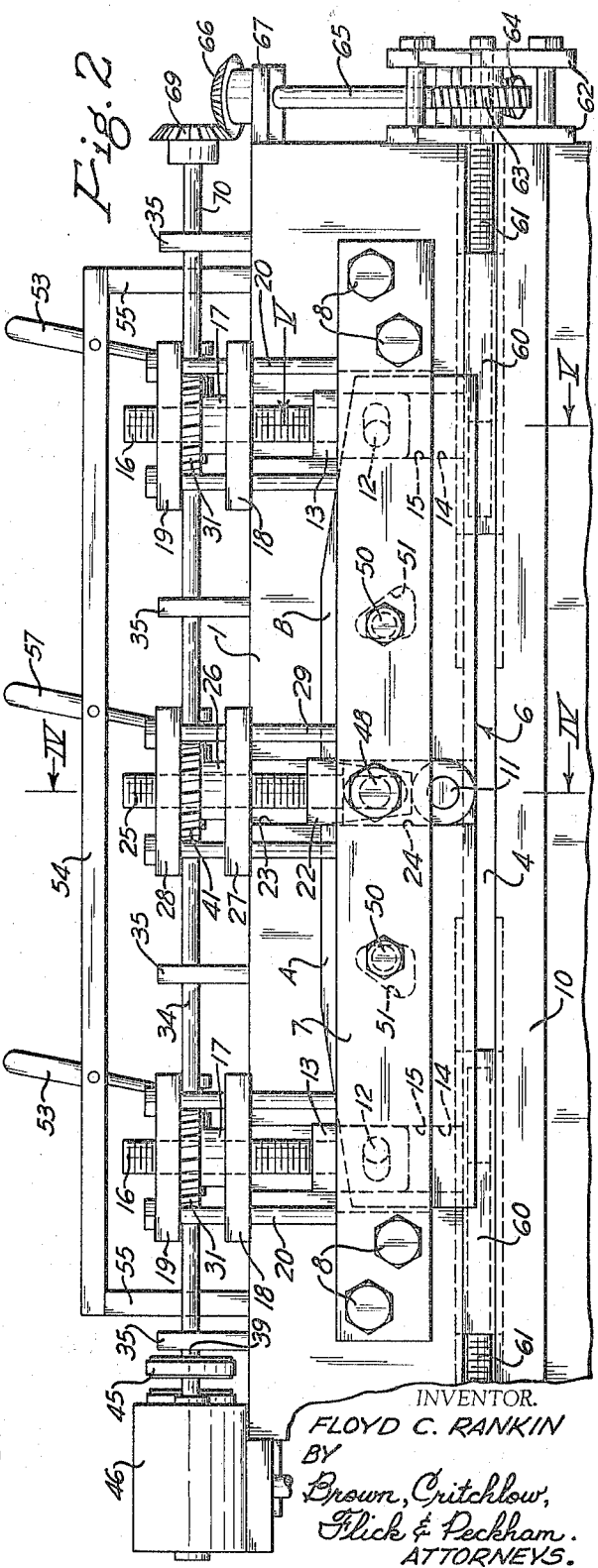

The preferred embodiment of the invention is illustrated in the accompanying drawings, in which FIG. 1 is a plan view of my extrusion die;
FIG. 2 is a front view thereof;
FIG. 3 is a view of the right-hand end of the die;
FIG. 4 is a cross section taken on the line IV—IV of FIG. 2;
FIG. 5 is a fragmentary cross section taken on the line V—V of FIG. 2;
FIG. 6 is a fragmentary vertical section taken on the line VI—VI of FIG. 4;
FIG. 7 is an enlarged fragmentary perspective view of the center pivot joint of the adjustable die plate; and
FIG. 8 shows in cross section an assembly of tread rubber strips of several different configurations that can be extruded through my die.

Referring to FIGS. 1 to 5 of the drawings, a rectangular vertical die block 1 is provided that is adapted to be clamped securely against the delivery end 2 of an extrusion machine in any suitable manner. It will be assumed for the purpose of this description that the extrusion machine operates in a horizontal direction so that tire tread rubber being forced out of the machine will pass through a horizontal orifice 3 in its front end and through a corresponding horizontal extrusion slot 4 extending through the die block. Engaging the front of the die block above the exit of the extrusion slot is a die plate 6 that is at least as long as the width of any strip of tire tread rubber to be extruded from the slot. The plate is held against the front of the die block by a horizontal cross bar 7 engaging the front of the plate and extending beyond its ends. Bolts 8 extend through the projecting ends of the bar and through spacing blocks 9 and into the die block. Secured to the front of the die block flush with the bottom wall of slot 4 is a bar 10 forming a forward extension of that wall directly below the die plate.

In order to support the die plate, a pivot pin 11 extends through the lower part of the plate midway between its ends, and other pivot pins 12 extend through the opposite ends of the plate. The opposite ends of each end pin 12 extend into a forked member 13 that straddles the end portion of the plate from above. These two forks are movable vertically in guideways 14 and 15 cut in the front of the die block and the back of cross bar 7, respectively. Rigidly mounted in the upper end of each fork is the lower end of a vertical screw 16 that extends up through an adjusting nut 17 above the die plate. Each nut is supported by a horizontal plate 18 secured to the top of the die block and projecting forward from it. Another plate 19 rests on top of the nut, where it is held by bolts 20 extending through both horizontal plates and down into the underlying die plate and cross bar to prevent the nut from moving upwardly.

Straddling the central portion of the die plate is another fork 22, the lower end of which is mounted on the central pivot pin 11. This fork is slidable vertically in guideways 23 and 24 in the die block and cross bar, and is supported by a screw 25 that in turn is supported by an adjusting nut 26 resting on a plate 27 projecting forward from the top of the die block. The nut supports a top plate 28 that is held down by bolts 29.

It is a feature of this invention that the upper part of each end nut 17 is in the form of a worm gear 31 that meshes with a worm 32 rotatably mounted between fixed collars 33 (FIG. 1) on a stationary horizontal shaft 34 extending along the top of the die block behind the vertical screws. The shaft is rigidly mounted in vertical blocks 35 secured to the top of the die block and projecting behind it. Rigidly connected to one end of each worm 32 is a spur gear 37 meshing with a gear 38 behind it splined on a shaft 39 journaled in blocks 35. In like manner the upper part of central nut 26 is in the form of a worm gear 41 that meshes with a worm 42 rotatably mounted on stationary shaft 34, where it can be turned by a spur gear 43 at one end driven by a gear 44 splined on rotatable shaft 39. The latter shaft can be rotated in either direction, when desired, through a belt and pulley drive 45 from a reversible electric motor 46 mounted on one end of the die block. When shaft 39 is turned, it rotates all of the worms and thereby turns the adjusting nuts in one direction or the other to raise or lower the die plate. As the lower edge of the die plate is lowered across the exit end of the extrusion slot, the height of that opening is reduced.

Another feature of this invention is that the die plate has a central joint that turns on the center pivot pin 11. This is accomplished by making the plate in two independent sections A and B, the inner ends of which are reduced to half thickness and overlapped, with the pin extending through them as shown in FIG. 7. The die plate above the center pin is notched out to allow the joint to function and also to straddle a center bolt 48 extending through cross bar 7. Also, center fork 22 is provided with a vertical slot 49, as shown in FIG. 6, to receive the same bolt. As long as all three adjusting nuts are turned simultaneously, the jointed die plate will be raised or lowered as a rigid unit. However, the center of the plate can be adjusted vertically relative to its ends by turning only the center nut 26, whereupon the plate sections A and B will pivot on all three pivot pins. If there are bolts 50 through the central parts of the plate sections, the latter must be provided with openings 51 for those bolts large enough to permit tilting of the plate sections. To turn only the center adjusting nut, first the spur gears 38 on rotatable shaft 39 are slid axially along it to disconnect them from the gears 37 with which they normally mesh. This is done by means of levers 53 pivoted to the back of a horizontal bar 54 extending across the die and mounted at its ends on uprights 55 secured to the top of the die block. The lower end of each lever extends into a circumferential groove in a hub 56 projecting from the adjoining gear 38 so that when the upper ends of the levers in FIG. 2 are swung to the left their lower ends will pull the adjoining gears to the right to interrupt the gear trains. With the two end trains of gears uncoupled, rotation of shaft 39 will cause the center gear train to turn the center nut 26 and thereby lower the center of the die plate so that the top of the strip of rubber being extruded from slot 4 will be concave transversely. If later it is desired to change the thickness of the strip but retain the same shape for its upper surface, the two end levers will be swung to couple the end gear trains again, whereupon rotation of shaft 39 will adjust all of the adjusting screws vertically simultaneously. In case the center of the die plate is at the desired elevation but the operator wishes to raise or lower the ends of the plate, he can uncouple the center train of gears by means of its lever 57 and then drive the shaft 39 to turn only the end adjusting nuts in order to rotate only the end screws. It will thus be seen that by merely operating the driving motor in one direction or the other, with all of the gear trains connected or with either the center train or the two end trains uncoupled, the height of the extrusion slot exit and the shape of its upper wall can be quickly changed. No wrenches are needed.

Another feature of this invention is that the vertical die plate 1 does not have anything to do with controlling the width of the strip being extruded. The width is determined by a pair of gate members in the form of bars 60 that are slidable in guideways lengthwise of the die block across the exit end of its slot 4. By moving these gate bars toward or away from each other, the width of the strip issuing from the slot is controlled. A convenient way of adjusting the gate bars is to provide each of them with a longitudinal bore that is open at its outer end and that is threaded internally. Screwed into these bores are screws 61, the outer ends of which are rotatably mounted in bearing plates 62 bolted to the ends of the die block. Rigidly mounted on these screws are worm gears 63 that mesh with worms 64 on the lower ends of shafts 65 having bevel gears 66 on their upper end. The shafts are attached to the opposite ends of the die by means of upper and lower brackets 67 and 68. The bevel gears mesh with other bevel gears 69 on the opposite ends of a shaft 70 that is journaled in blocks 35. This shaft is driven through a belt and pulley drive 71 from a second reversible electric motor (not shown) mounted in any suitable manner behind the die. By rotating the shaft, the screws will be turned and the gate bars will be moved toward or away from each other as desired. This operation is entirely separate from the adjustment of the die plate, but the gate bars cooperate closely with the die plate in controlling the shape and size of the exit end of the extrusion slot.

The edges of the strip of tread rubber issuing from slot 4 are trimmed and beveled by adjustable cutters such as shown in U.S. Pat. No. 2,720,679 mentioned above.

The adjustable cutter mechanism can be mounted on the front of the die block below the extrusion slot. Nothing more needs to be said about that mechanism here, because this invention is concerned only with means for controlling the height, width and shape of the extrusion orifice itself.

In FIG. 8 sections of a number of tread rubber strips of different shapes and sizes are shown to illustrate a few of the innumerable sections that can be produced with my adjustable die. The beveled ends of the sections are formed by cutters, such as mentioned in the preceding paragraph, but they do operate on the tread strip until it has left the die orifice.

The only manual operations required in adjusting my die, and they are not always necessary, are the swinging of lever 57 or levers 53 to uncouple or couple one or more of the gear trains that drive the vertical adjusting screws. The other adjustments are made by operating either or both of the electric driving motors that drive the gears and adjust the gate bars 60. Consequently, the die can be quickly adjusted with a minimum of effort, thereby materially reducing the cost of making adjustments.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An adjustable die for extruding a strip of tire tread rubber, comprising a die block provided with a horizontal extrusion slot therethrough for passage of the tread rubber under pressure, a vertical die plate mounted above the exit end of said slot, means for adjusting the plate bodily downward across the slot to reduce the height of the slot exit, said plate being formed from two longitudinally aligned plate sections having overlapping inner ends connected by a horizontal pivot, and means for adjusting said pivot vertically relative to the outer ends of said plate sections to change the longitudinal shape of the bottom of the plate, whereby to provide a predetermined shape for the top of the tread strip issuing from said slot.

2. An adjustable die for extruding a strip of tire tread rubber, comprising a die block provided with a horizontal extrusion slot therethrough for passage of the tread rubber under pressure, a vertical die plate mounted above the exit end of said slot, vertical non-rotatable screws supporting the opposite ends and the center of the plate, nuts mounted on said screws, means holding the nuts against vertical movement, means for turning all of said nuts in unison to adjust the die plate bodily downward across the slot to reduce the height of the slot exit, said plate being jointed centrally on a horizontal axis, and means for selectively rotating only the center nut to adjust the center of said plate vertically relative to its ends to provide a predetermined shape for the top of the tread strip issuing from said slot.

3. An adjustable die for extruding a strip of tire tread rubber, comprising a die block provided with a horizontal extrusion slot therethrough for passage of the tread rubber under pressure, a vertical die plate mounted above the exit end of said slot, vertical non-rotatable screws supporting the opposite ends and the center of the plate, nuts mounted on said screws, means holding the nuts against vertical movement, a drive shaft, a gear train operatively connecting said shaft with each nut for turning all of said nuts in unison to adjust the plate bodily downward across the slot to reduce the height of the slot exit, said plate being jointed centrally on a horizontal axis, and means for uncoupling the gear trains from the end screws so that only the center nut can be turned to adjust the center of said plate vertically in order to provide a predetermined shape for the top of the tread strip issuing from said slot.

4. An adjustable die for extruding a strip of tire tread rubber, comprising a die block provided with a horizontal extrusion slot therethrough for passage of the tread rubber under pressure, a vertical die plate mounted above the exit end of said slot, vertical non-rotatable screws supporting the opposite ends and the center of the plate, nuts mounted on said screws, means holding the nuts against vertical movement, a drive shaft extending horizontally across all of said screws, a gear splined on said shaft adjacent each screw, gears operatively connecting each of said shaft gears with the adjacent nut so that all of the nuts can be turned in unison by the shaft to adjust the die plate bodily downward across said slot exit to reduce the height thereof, said plate being jointed centrally on a horizontal axis, and manually operable means associated with each shaft gear for sliding it along the shaft.

5. An adjustable die for extruding a strip of tire tread rubber, comprising a die block provided with a horizontal extrusion slot therethrough for passage of the tread rubber under pressure, a pair of laterally spaced gate members disposed in the exit end of the slot, means including an electric driving motor for adjusting said members toward and away from each other to vary the width of the slot exit, a vertical die plate mounted above the exit end of said slot, means for adjusting the plate bodily downward across the slot to reduce the height of the slot exit, said plate being jointed centrally on a horizontal axis, and means for adjusting the jointed center of the plate vertically relative to its ends to provide a predetermined shape for the top of the tread strip issuing from said slot, said motor being operable independently of said die plate adjusting means.

References Cited by the Examiner

UNITED STATES PATENTS

| 2,842,796 | 7/1948 | Rhodes | 18—12 |
| 3,093,860 | 6/1963 | Eilersen | 18—12 |
| 3,112,527 | 12/1963 | Pankratz et al. | 18—12 |

FOREIGN PATENTS

| 1,303,861 | 8/1962 | France. |

WILLIAM J. STEPHENSON, *Primary Examiner.*